United States Patent
Takano et al.

(10) Patent No.: US 7,925,597 B2
(45) Date of Patent: Apr. 12, 2011

(54) POWER SYSTEM STABILIZATION SYSTEM

(75) Inventors: Tomihiro Takano, Tokyo (JP); Masashi Fujitsuka, Tokyo (JP); Yasuhiro Kojima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 487 days.

(21) Appl. No.: 12/095,030

(22) PCT Filed: Feb. 15, 2006

(86) PCT No.: PCT/JP2006/302611
§ 371 (c)(1),
(2), (4) Date: May 27, 2008

(87) PCT Pub. No.: WO2007/094054
PCT Pub. Date: Aug. 23, 2007

(65) Prior Publication Data
US 2009/0164393 A1    Jun. 25, 2009

(51) Int. Cl.
*G01R 11/56* (2006.01)
*G05D 5/00* (2006.01)
(52) U.S. Cl. ............... 705/412; 700/286; 700/295
(58) Field of Classification Search ............ 705/412, 705/10, 7; 700/286–298; 219/482, 490, 219/497
See application file for complete search history.

(56) References Cited

U.S. PATENT DOCUMENTS

| | | | | | |
|---|---|---|---|---|---|
| 4,564,003 | A | * | 1/1986 | Iwanicki et al. | 126/615 |
| 2007/0198133 | A1 | * | 8/2007 | Hirst | 700/295 |
| 2010/0072817 | A1 | * | 3/2010 | Hirst | 307/31 |

FOREIGN PATENT DOCUMENTS

| | | | |
|---|---|---|---|
| JP | 61-92127 A | | 5/1986 |
| JP | 64-16222 A | | 1/1989 |
| JP | 402307397 | * | 12/1990 |
| JP | 5-15700 U | | 2/1993 |
| JP | 2002-135979 A | | 5/2002 |
| JP | 2002-165366 A | | 6/2002 |
| JP | 2003-92829 A | | 3/2003 |
| JP | 2003-134668 A | | 5/2003 |
| JP | 2003-229154 A | | 8/2003 |
| JP | 2005-143218 A | | 6/2005 |
| WO | WO 94/06191 | * | 3/1994 |

* cited by examiner

*Primary Examiner* — Igor Borissov
(74) *Attorney, Agent, or Firm* — Leydig, Voit & Mayer, Ltd.

(57) ABSTRACT

In a power system stabilization system for stabilizing a small-scale electric power system to which electric power generated by a rotating power generator is supplied, an electric water heater receives electric power from the electric power system and heats water, a system frequency measuring device measures system frequency of the electric power system, and a hot water controller increases the power consumption of the electric water heater when the system frequency exceeds a reference frequency, and decreases the power consumption of the electric water heater when the system frequency is less than the reference frequency.

4 Claims, 7 Drawing Sheets

POWER SYSTEM STABILIZATION SYSTEM

TECHNICAL FIELD

The present invention relates to a power system stabilization system that serves to stabilize the quality of power in a regional energy supply system having natural energy power generation.

BACKGROUND ART

A conventional regional energy supply system provided with natural energy electric power generation equipment using natural energy such as wind power, solar power, etc., has a distributed power supply device with a storage battery for eliminating the instability of power supply due to frequent output fluctuations thereof, and includes an optimum system operation planning section that creates an optimum operation plan of the distributed power supply device, and a control command value decision section that stores an amount of accumulated or stored electricity (electric power) and the cost for accumulating or storing electricity (electric power) by measuring and summing the amount of charge and discharge and the charging cost of the storage battery, wherein when it is determined, by the calculation of simulating the cases when the amount of charge and discharge of the storage battery is increased or decreased, that the sum of an amount of variation of the cost of buying and selling electric power due to the transmission (receiving and sending) thereof with an electric power system and an amount of variation of the charging cost due to the amount of charge and discharge of the storage battery becomes negative, the control command value decision section changes a control command value for the amount of charge and discharge of the storage battery in the process of the optimum operation plan, and sends it to the distributed power supply device (see, for example, a first patent document).

First Patent Document Japanese patent application laid-open No. 2005-143218

DISCLOSURE OF THE INVENTION

Problems to be Solved by the Invention

However, the electricity accumulation or storage equipment has the problem that it is high in cost and the service life thereof is short in comparison with other equipment.

The object of the present invention is to provide a power system stabilization system which serves to make it stable at a low cost to maintain the demand and supply of electric power within a regional energy supply system or the quality of electric power of a commercial power system in which an amount of natural energy power generation introduced has been increased.

Means for Solving the Problems

In a power system stabilization system for stabilizing a small-scale electric power system to which electric power generated by a rotating power generator is supplied, the power system stabilization system according to the present invention includes: an electric water heater that receives electric power from said electric power system and heats water; a system frequency measuring device that measures a system frequency of said electric power system; and a hot water controller that increases the power consumption of said electric water heater when said system frequency exceeds a reference frequency, and on the contrary, decreases the power consumption of said electric water heater when said system frequency is less than the reference frequency, whereby the frequency of said electric power system is maintained within a predetermined range.

EFFECTS OF THE INVENTION

The advantageous effects of the power system stabilization system according to the present invention are as follows. That is, the balance of the power demand and supply of the electric power system is recovered by increasing and decreasing the power consumption of an electric water heater based on a system frequency controlled by a rotating power generator in accordance with the demand and supply balance of the electric power system, and the system stabilization system can be achieved at a low cost because the electric water heater is in general existing with customers.

DESCRIPTION OF THE PREFERRED EMBODIMENTS

Embodiment 1

Figure 1:
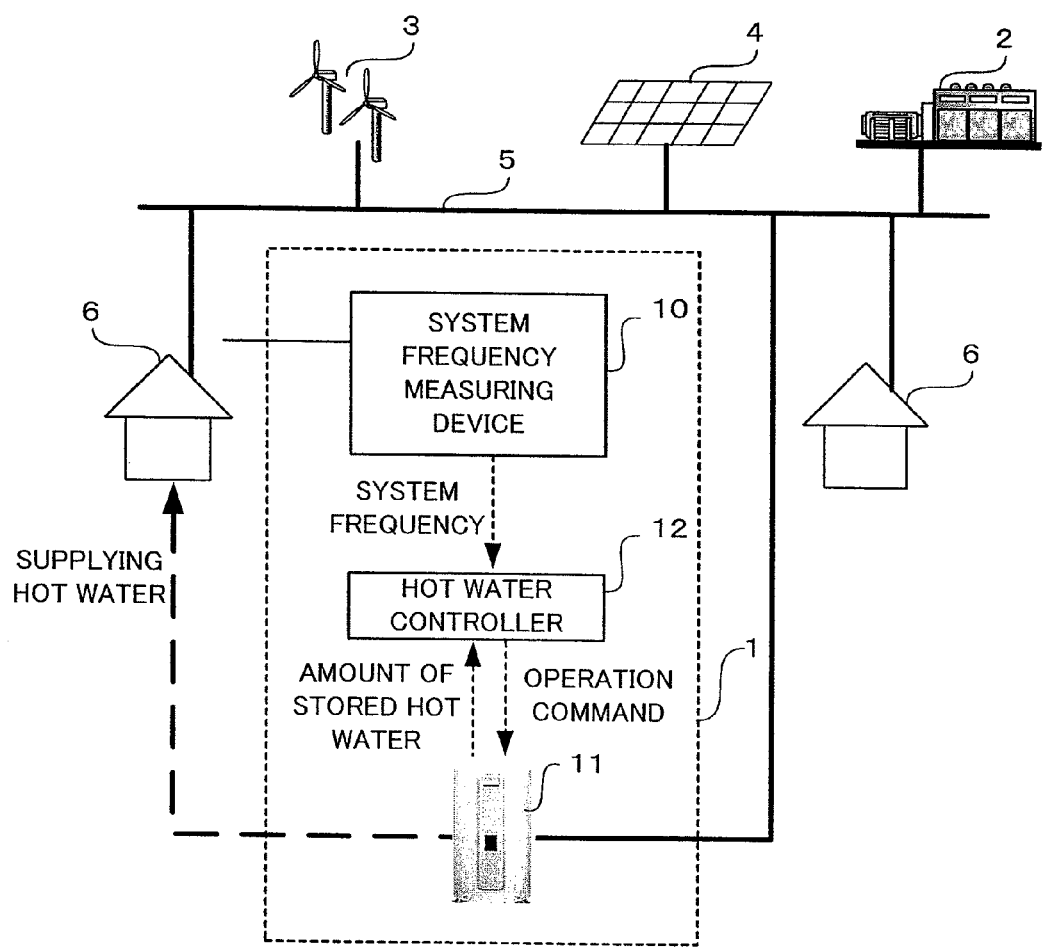
FIG. 1 is a block diagram of a power system provided with a power system stabilization system according to a first embodiment of the present invention.

FIG. 1 is a block diagram of a power system provided with a power system stabilization system according to a first embodiment of the present invention.

A power system stabilization system 1 according to the first embodiment of the present invention is intended to maintain and stabilize the power quality of an electric power system 5 of a regional energy supply system to which a rotating power generator 2, which generates electric power by combusting fossil fuel, wind power generation equipment 3 and photovoltaic generation equipment 4, which serve to perform natural energy power generation, are connected. A customer 6 is connected to this electric power system 5, wherein electric power is supplied not by an electric power company but by a small-scale system. Here, note that warm water is also supplied to the regional energy supply system.

As shown in FIG. 1, the power system stabilization system 1 according to the first embodiment includes a system frequency measuring device 10 for measuring the system frequency of the electric power system 5, an electric water heater 11 for supplying warm water to the customer 6, and a hot water controller 12 for controlling the operation of the electric water heater 11 based on the system frequency and the amount of hot water in the electric water heater 11. This electric water heater 11 is supplied with electric power from the electric power system 5 to heat water. This electric water heater 11 is an electric water heater, a heat pump water heater, etc.

The frequency of the electric power system 5 is decided by the rotating power generator 2, and the wind power generation equipment 3 and the photovoltaic generation equipment 4 are synchronized with the frequency to generate electricity.

If the balance of electric power supply and demand in the electric power system 5 can be maintained, the rotating power generator 2 generates electricity at a constant frequency. When the power demand and supply balance is broken to bring about an excess of supply, the frequency of the rotating power generator 2 rises naturally due to the characteristic of the rotating power generator 2, whereas on the contrary, when the power supply becomes short, the frequency comes down naturally.

Accordingly, the balance of power supply and demand in the electric power system 5 can generally be determined by taking the system frequency into consideration. In addition, in case where a reference frequency of the electric power system is set to F0 Hz, when the system frequency FC Hz exceeds the reference frequency F0, it means that the power supply exceeds the power demand, whereas when the system frequency FC is lower than the reference frequency F0, it means that the power demand exceeds the power supply.

The system frequency measuring device 10 serves to measure the system frequency FC that varies naturally in this manner due to the unbalance of supply and demand of electric power, and send it to the hot water controller 12.

In a method of recovering the balance between the power supply and demand by increasing and decreasing the power consumption of the electric water heater 11 according to the present invention, there is provided a dead zone which extends above and below the reference frequency F0 so as to be sandwiched between a dead zone upper limit Fd1 Hz and a dead zone lower limit Fd2 Hz. When the system frequency FC is in the dead zone, the power consumption of the electric water heater 11 is left as it is, whereas when the system frequency FC deviates from the dead zone, the operating condition of the electric water heater 11 is changed whereby the power consumption thereof is increased or decreased. Here, it is to be noted that only when the system frequency FC continuously deviates from the dead zone for a predetermined time, it is determined to be actually deviated therefrom, so the operating condition is changed. As such a predetermined time, an up side control delay time TUP is set at the time when the system frequency FC exceeds the dead zone upper limit Fd1, and a down side control delay time TDN is set at the time when the system frequency FC is less than the dead zone lower limit Fd2.

In addition, a hot water storage rate upper limit and a hot water storage rate lower limit are provided for the amount of hot water stored in the electric water heater 11. When the amount of stored hot water exceeds the hot water storage rate upper limit, the dead zone is moved to a high frequency side, and the up side control delay time TUP is made longer and the down side control delay time TDN is made shorter.

On the contrary, when the amount of stored hot water is less than the hot water storage rate lower limit, the dead zone is moved to a low frequency side, and the up side control delay time TUP is made shorter and the down side control delay time TDN is made longer.

The hot water controller 12 changes the dead zone, the up side control delay time TUP and the down side control delay time TDN based on the hot water storage rate by means of the above-mentioned method. Further, the hot water controller 12 determines the demand and supply balance of electric power based on the system frequency according to the above-mentioned method, and if it is in the excess of power supply, the power demand is increased by making the power consumption of the electric water heater 11 larger to store it as thermal energy, whereas if it is short of the power supply, the power demand is decreased by making the power consumption of the electric water heater 11 smaller.

When it is in the excess of the power supply, the power consumption is increased by a change value ΔP of the power consumption that is obtained by multiplying a difference between the system frequency FC and the dead zone upper limit Fd1 by a predetermined coefficient k1.

On the contrary, when it is short of the power supply, the power consumption is decreased by a change value ΔP of the power consumption that is obtained by multiplying the difference between the system frequency FC and the dead zone lower limit Fd2 by the predetermined coefficient k1.

Here, it is to be noted that when the system frequency FC is within the dead zone or temporarily deviates from the dead zone, the power consumption of the electric water heater 11 is left just as it is. The hot water controller 12 is constituted by a computer that has a CPU, a ROM, a RAM and an interface circuit.

The electric water heater 11 receives an operation command from the hot water controller 12, and changes the operating state thereof so as to increase and decrease the power consumption thereof by changing conditions such as activation, stopping, an operating load factor, etc.

Figure 2:
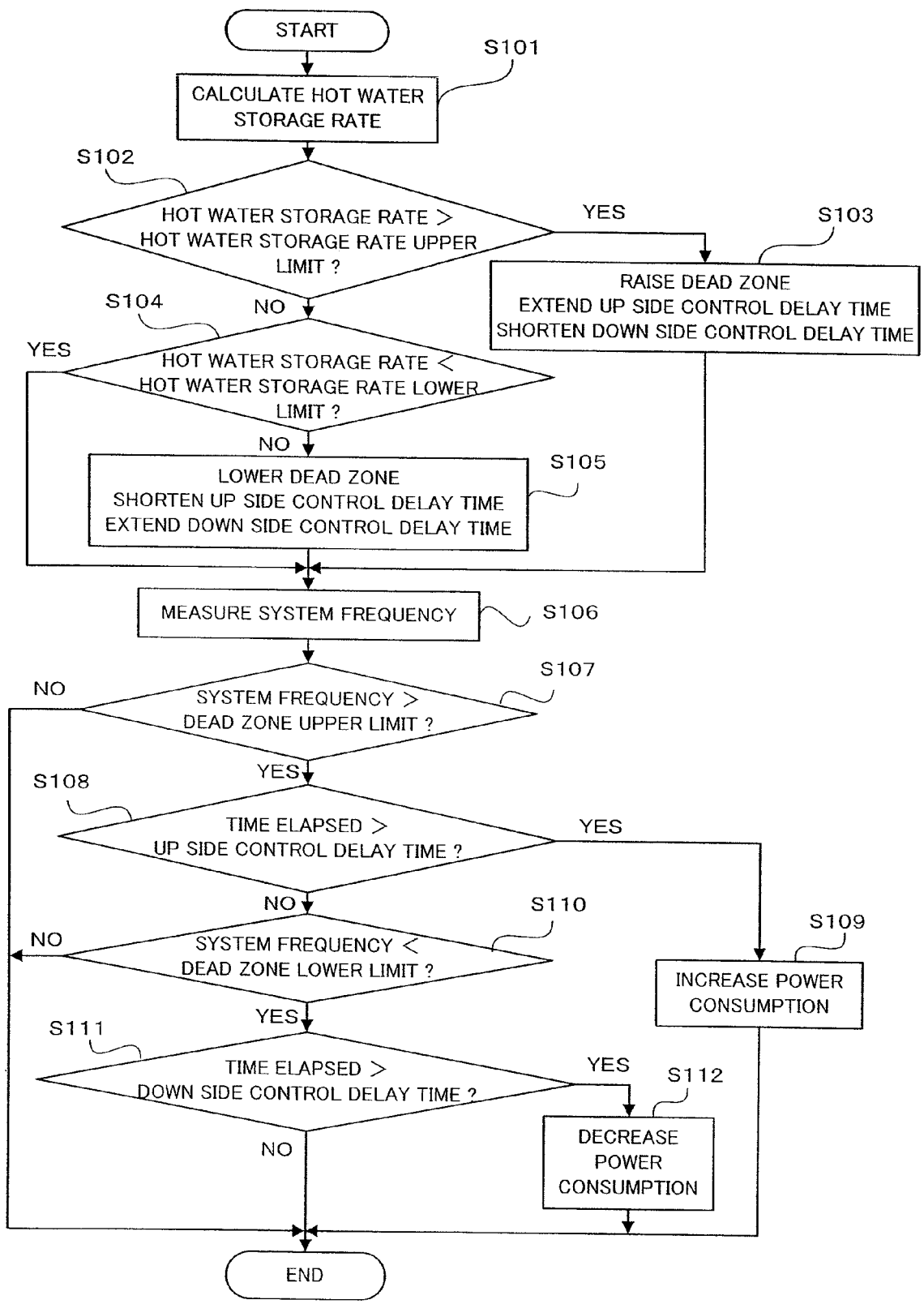
FIG. 2 is a flow chart of an operation command decision routine that is performed in a hot water supply controller according to the first embodiment.
Figure 3:
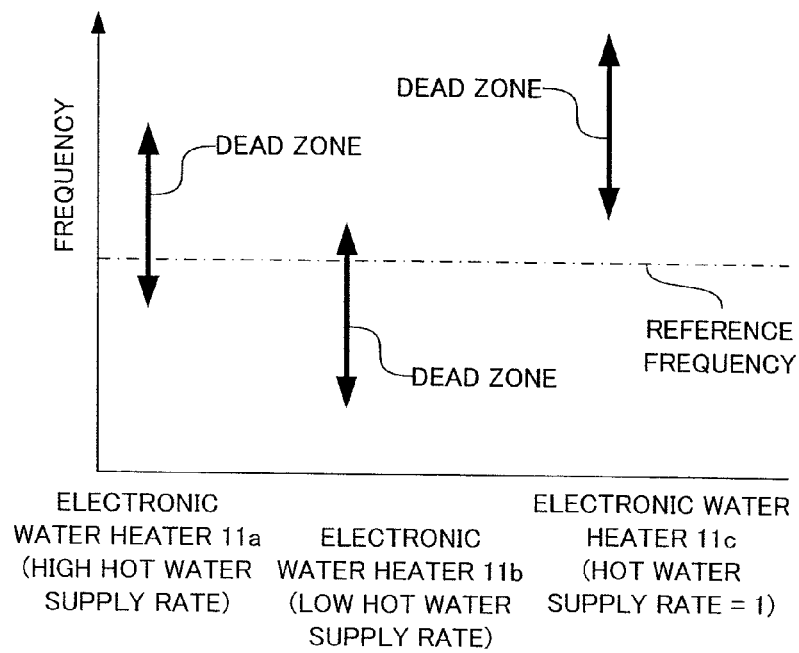
FIG. 3 is a graph that shows the magnitude of dead zones in case where there are a plurality of power system stabilization systems.

FIG. 2 is a flow chart of an operation command decision routine that is performed in the hot water supply controller 12.

Next, reference will be made to the operation of the power system stabilization system 1 according to this first embodiment while referring to FIG. 2.

When the power system stabilization system 1 is in operation, this operation command decision routine is activated in a periodic manner.

In step S101, the hot water storage rate (from 0 when the hot water is empty to 1 when it is full) is calculated from the amount of hot water stored in the electric water heater 11.

When, in step S102, the hot water storage rate exceeds the hot water storage rate upper limit, the control process proceeds to step S103, whereas when the hot water storage rate is less than the hot water storage rate upper limit, the control process proceeds to step S104.

In step S103, both the dead zone upper limit and the dead zone lower limit are raised so that water should not be boiled or heated in a preferential manner, and at the same time, the up side delay time until the power consumption is increased is extended, and the down side delay time is shortened, after which the control process proceeds to step S106.

When, in step S104, the hot water storage rate is less than the hot water storage rate lower limit, the control process proceeds to step S105, whereas when the hot water storage rate is equal to or larger than the hot water storage rate lower limit, the control process proceeds to step S106.

In step S105, both the dead zone upper limit and the dead zone lower limit are lowered so that the electric water heater 11 heats or boil the water therein in a preferential manner, and at the same time, the up side delay time until the power consumption is increased is shortened, and the down side delay time is extended, after which the control process proceeds to step S106.

In step S106, the system frequency is measured and then the control process proceeds to step S107.

In step S107, it is determined whether the frequency exceeds the dead zone upper limit, and when the frequency exceeds the dead zone upper limit, the control process proceeds to step S108, whereas when the frequency is equal to or less than the dead zone upper limit, the operation command decision routine is terminated.

In step S108, it is determined whether the period of time in which the frequency exceeds the dead zone upper limit continues for over the up side delay time, and when it continues, the control process proceeds to step S109, whereas when it does not continue, the control process proceeds to step S110.

In step S109, the power consumption of the electric water heater 11 is increased and the operation command decision routine is then terminated.

In step S110, it is determined whether the frequency is less than the dead zone lower limit, and when the frequency is less than the dead zone lower limit, the control process proceeds to step S111, whereas when the frequency is equal to or larger than the dead zone lower limit, the operation command decision routine is terminated.

In step S111, it is determined whether the period of time in which the frequency is less than the dead zone upper limit continues for over the down side delay time, and when it continues, the control process proceeds to step S112, whereas when it does not continue, the operation command decision routine is terminated.

In step S112, the power consumption of the electric water heater 11 is decreased and the operation command decision routine is then terminated.

Such a power system stabilization system 1 serves to recover the balance of the power demand and supply of the electric power system 5 by increasing and decreasing the power consumption of the electric water heater 11 based on the system frequency controlled by the rotating power generator 2 in accordance with the demand and supply balance of the electric power system 5, and the electric water heater 11 is generally provided in the customer 6, so it is possible to achieve the power system stabilization system 1 at a low cost.

In addition, in the hot water controller 12, the dead zone for the system frequency is determined beforehand, and the power consumption of the electric water heater 11 is increased and decreased only when the system frequency deviates from this dead zone, so it is possible to prevent the power consumption of the electric water heater 11 from changing at all times.

Figure 4:
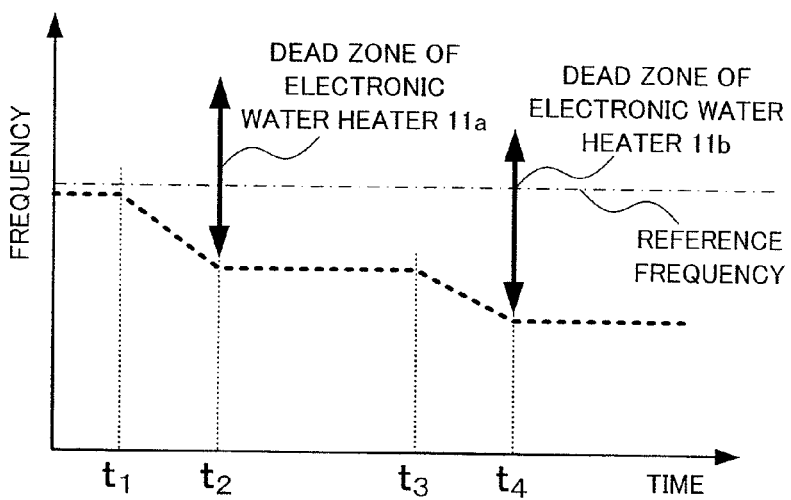
FIG. 4 is a graph that shows the change of the power consumption of electric water heaters when a system frequency becomes lower in case where there are a plurality of power system stabilization systems.

FIG. 4 shows the operating states of the dead zones of plural power system stabilization systems 1 which are provided in an electric power system 5.

Although in the description up to this point, there has been explained the case where the electric power system 5 is provided with the single power system stabilization system 1, reference will be made, in the following description, to power system stabilization with respect to an electric power system 5 which is provided with a plurality of power system stabilization systems 1.

Since the operating times and the amounts of hot water used in individual customers 6 are different from one another, the dead zones of the individual power system stabilization systems 1 are mutually different from one another, as shown in FIG. 4. The hot water storage rate of an electric water heater 11a is high, so the dead zone thereof is located on a high frequency side, and the hot water storage rate of an electric water heater 11b is low, so the dead zone thereof is located on a low frequency side. In addition, the hot water storage rate of an electric water heater 11c is 1, so the dead zone thereof is located at a high frequency side endpoint.

Figure 5:
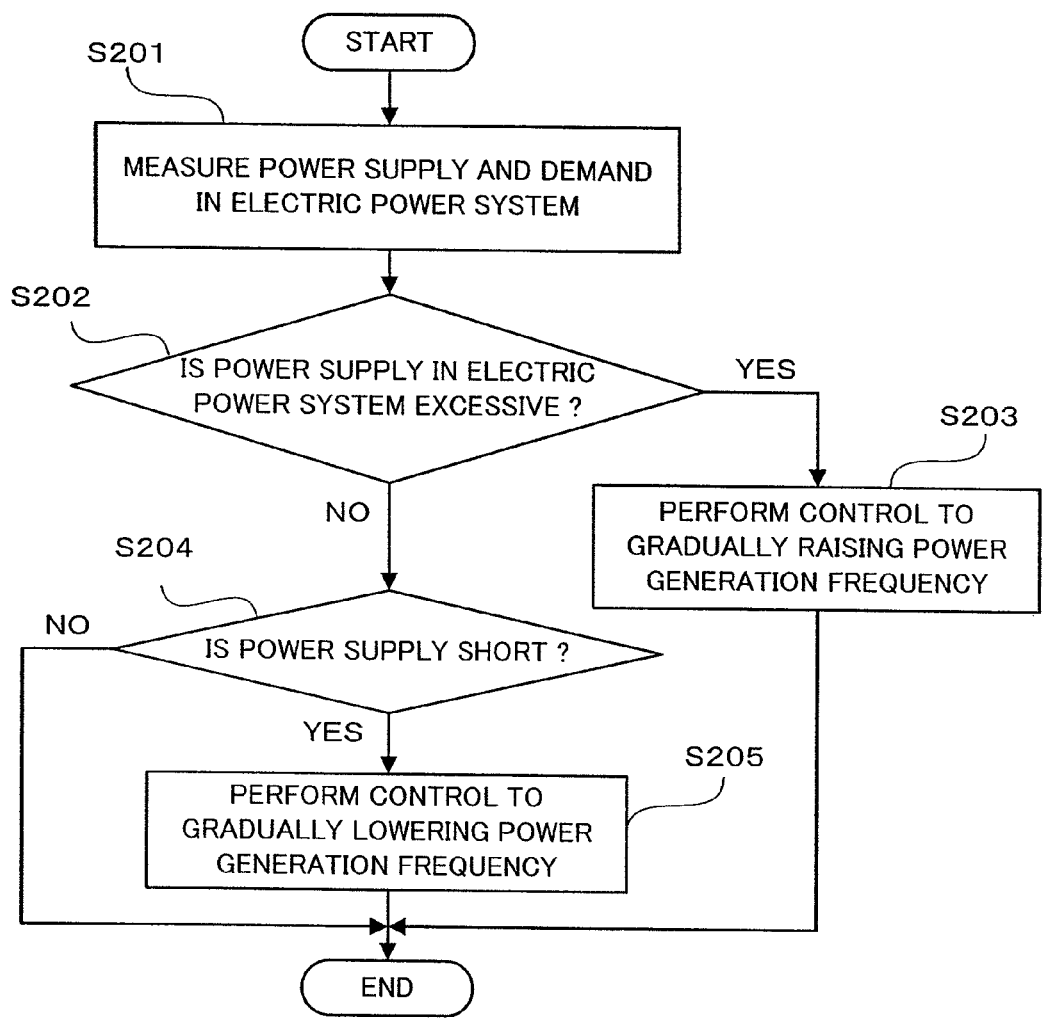
FIG. 5 is a flow chart of a procedure for controlling a power generation frequency by a rotating power generator which predicts the balance between supply and demand of power according to the first embodiment.

In such an electric power system 5, when the power demand increases, resulting in a shortage of the power supply, the system frequency lowers from time point t1 in FIG. 5. Then, at time point t2, the system frequency becomes less than the dead zone lower limit of the electric water heater 11a, so the power consumption of the electric water heater 11a is decreased. Further, as the power demand increases from time point t3, the system frequency decreases further, and at time point t4, it becomes less than the dead zone lower limit of the electric water heater 11b, so the power consumption of the electric water heater 11b is decreased.

In this manner, the system frequency goes down gradually due to the shortage of the power supply, and at time point t2 at which the system frequency falls below the dead zone lower limit of the electric water heater 11a, the system frequency is controlled in a direction to decrease the power consumption of the electric water heater 11a, but at this time point t2, the system frequency remains within the dead zone of the electric water heater 11b, so the power consumption of the electric water heater 11b is not changed. In addition, when the system frequency continues to fall due to the continued power shortage, the electric water heater 11b is also controlled in a direction to decrease the power consumption thereof. On the other hand, in the electric water heater 11c, the dead zone is located in the high frequency region, so it is possible to prevent a further water boiling or heating operation thereof.

With such a power system stabilization systems 1, the amounts of hot water used by the customers are different from one another, and the hot water storage rates thereof are different, resulting in variations in the dead zone upper limits, the dead zone lower limits, and the control delay times. As a result, the changes of the power consumptions of the individual electric water heaters 11 with respect to the frequency variation are not uniform but varying in a time series manner, thus making it possible to prevent the system frequency from hunting.

In the first embodiment, the rotating power generator 2 generates electricity in accordance with the system frequency of the electric power system, but in case where there is the possibility that power supply shortage will occur in the near future or power generation of a high power generation unit cost will be needed, or the like, as shown in FIG. 5, the power generation frequency is intentionally made smaller to lower the system frequency, while on the contrary, in case where there is the possibility that excessive electric power supply will occur or the power generation efficiency will be reduced due to a high electrical load, the power generation frequency is intentionally made larger, thereby increasing the system frequency.

In this manner, the rotating power generator 2 predicts the operating condition thereof in the future and changes the system frequency, whereby it is possible to stabilize the electric power system not only at the current point in time but also from after a few minutes.

In addition, there is an advantageous effect that in case where electricity storage equipment is used together in the electric power system for the purpose of maintaining the demand and supply balance therein, the electricity storage capacity thereof can be reduced.

Moreover, an electric power load, which is consumed by electric hot water supply equipment, can be indirectly controlled through the variation of the frequency and electricity price. As a result, there is an advantageous effect that the overall power generation efficiency in the electric power system can be improved by increasing the electric power load during natural energy power generation which is low in cost.

Embodiment 2

Figure 6:
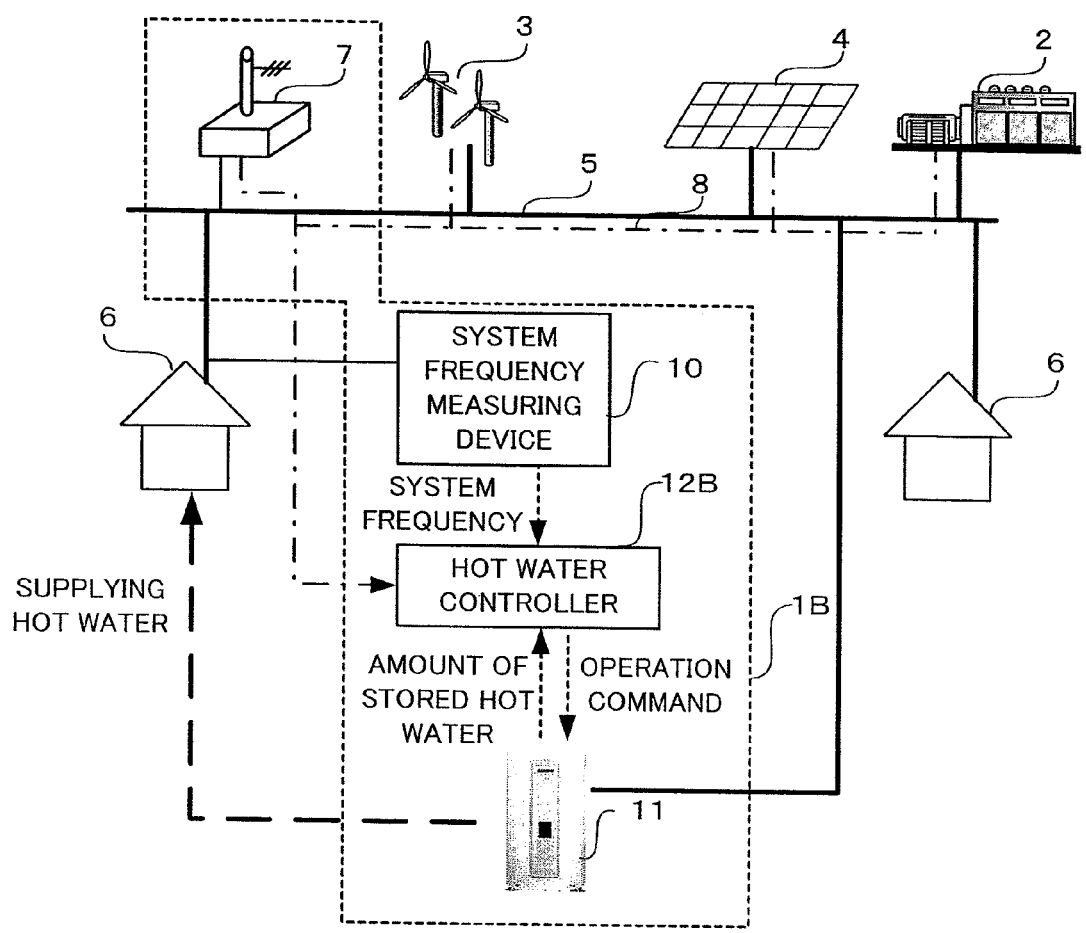
FIG. 6 is a block diagram of a power system provided with a power system stabilization system according to a second embodiment of the present invention.

FIG. 6 is a block diagram of a power system provided with a power system stabilization system according to a second embodiment of the present invention.

As shown in FIG. 6, a power system stabilization system 1B according to the second embodiment of the present invention has a control center 7 added to the power system stabilization system 1 according to the first embodiment, and also has a hot water controller 12B which is different from the one in the first embodiment, but the other construction of this second embodiment is similar to the first embodiment, and hence like components or parts are identified by the same symbols while omitting a detailed explanation thereof.

The control center 7 acquires data concerning the power generation condition of the rotating power generator 2, the wind power generation equipment 3, and the photovoltaic generation equipment 4, calculates the electricity price of the electric power system 5 at the current point in time in real time, and notifies it the hot water controller 12.

In addition, the control center 7 raises the electricity price in case where there is the possibility that power supply shortage will occur in the near future with respect to the electricity price at the current point in time or power generation of a high power generation unit price will be needed, or the like, whereas in the opposite case, it reduces the electricity price, and notifies it to the hot water controller 12B.

The control center 7, the individual pieces of power generation equipment and the hot water controller 12B are connected with one another by means of a communication line 8.

Moreover, in the hot water controller 12B, an electricity price upper limit and an electricity price lower limit are determined beforehand, and when the electricity price obtained from the control center 7 exceeds the electricity price upper limit, the price of electricity used to supply hot water becomes higher, so heating or boiling water is reduced as much as possible, whereas when, on the contrary, the electricity price obtained from the control center 7 is less than electricity price lower limit, the price of electricity used to supply hot water becomes lower, so heating or boiling hot water is increased as much as possible.

Figure 7:
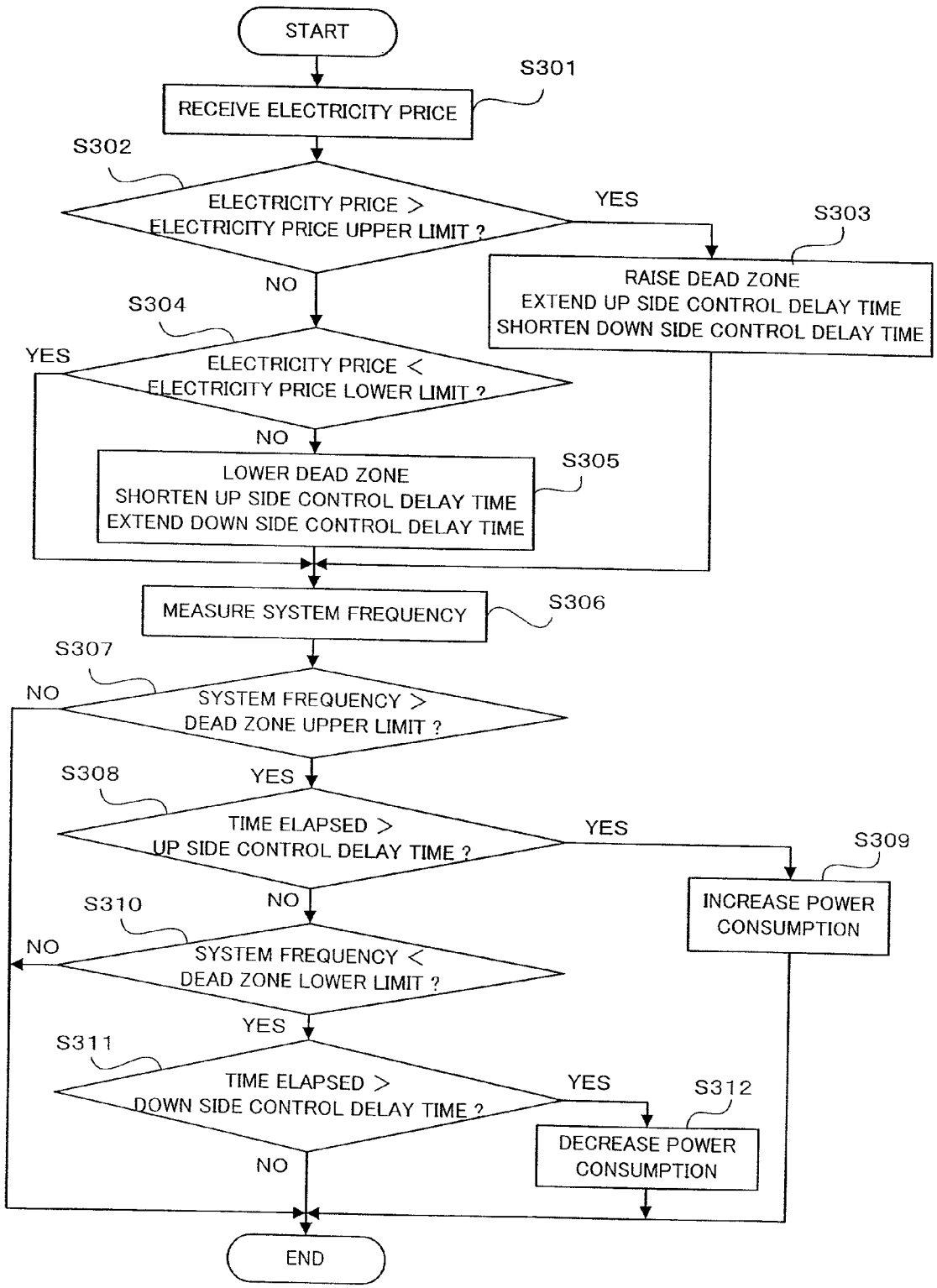
FIG. 7 is a flow chart of an operation command decision routine that is performed in a hot water supply controller according to the second embodiment.

FIG. 7 is a flow chart of an operation command decision routine that is performed in the hot water supply controller 12B according to the second embodiment.

Next, reference will be made to the operation of the power system stabilization system 1B according to this second embodiment while referring to FIG. 7. Here, note that the procedure in steps S307 through S311 in FIG. 7 is similar to the procedure in steps S107-S111 in FIG. 2, so an explanation thereof is omitted, and the procedure in different steps S301 through S305 will be described below.

When the power system stabilization system 1B is in operation, this operation command decision routine is activated in a periodic manner.

In the step S301, an electricity price from the control center 7 is received.

When, in step S302, the electricity price exceeds the electricity price upper limit, the control process proceeds to step S303, whereas when the electricity price is less than the electricity price upper limit, the control process proceeds to step S304.

In step S303, both the dead zone upper limit and the dead zone lower limit are raised so that water should not be boiled or heated preferentially, and at the same time, the up side delay time until the power consumption is increased is extended, and the down side delay time is shortened, after which the control process advances to step S306.

When, in step S304, the electricity price is less than the electricity price lower limit, the control process proceeds to step S305, whereas when the hot electricity price is equal to or larger than the electricity price lower limit, the control process proceeds to step S306.

In step S305, both the dead zone upper limit and the dead zone lower limit are lowered so that the electric water heater 11 heats or boil the water therein in a preferential manner, and at the same time, the up side delay time until the power consumption is increased is shortened, and the down side delay time is extended, after which the control process proceeds to step S306.

Such a power system stabilization system 1B calculates, in the control center 7, the electricity price of the electric power system at the current point in time or in the future, and the amount of water to be boiled or heated is controlled based on the electricity price thus calculated, so it is possible to supply hot water to the customer at a low cost.

In addition, the electricity price is predicted, and the amount of hot water stored in the electric water heater 11 is controlled based the electricity price thus predicted, the power demand and supply balance within the region can be maintained.

Embodiment 3

Figure 8:
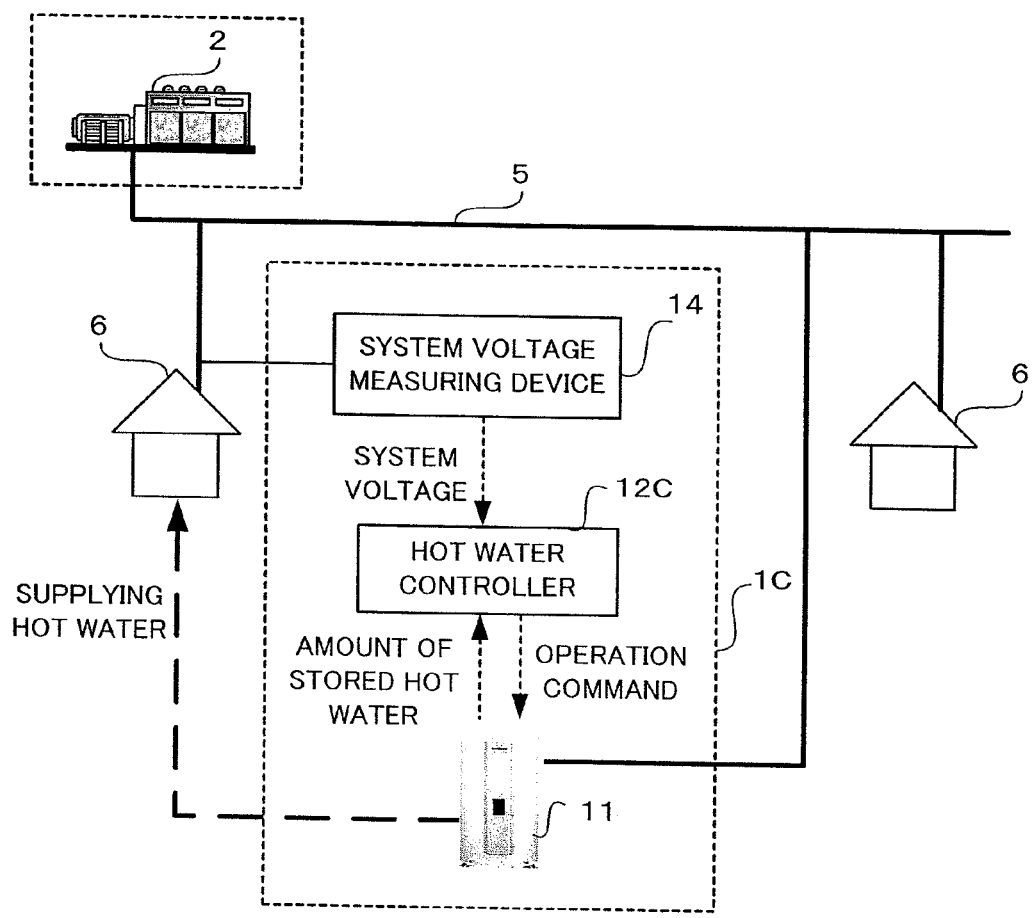
FIG. 8 is a block diagram of a power distribution system provided with a power system stabilization system according to a third embodiment of the present invention.

FIG. 8 is a block diagram of a power distribution system provided with a power system stabilization system according to a third embodiment of the present invention.

In the above-mentioned first and second embodiments, an explanation has been made to the recovery of the unbalance of power supply and demand by increasing and decreasing the power consumption in the electric water heater 11 based on the system frequency that changes depending on the balance of power supply and demand of the electric power system, but in a power system stabilization system 1C according to the third embodiment to be described below, it is a problem to maintain a voltage at a power receiving point of the customer 6.

As shown in FIG. 8, the power system stabilization system 1C according to the third embodiment of the present invention has an electric water heater 11 which functions to control power consumption at the power receiving point, as in the power system stabilization system 1 according to the first embodiment. However, the power system stabilization system 1C according to the third embodiment includes, unlike the first embodiment, a system voltage measuring device 14 instead of the system frequency measuring device 10, and a hot water controller C instead of the hot water controller 12.

The system voltage measuring device 14 according to the third embodiment serves to measure the system voltage at the power receiving point of the customer 6, and to send it to the hot water controller 12C. The hot water controller 12C according to the third embodiment serves to control the power consumption of the electric water heater 11 based on the system voltage so that the system voltage is made to coincide with a reference voltage.

Such a power system stabilization system 1C is able to increase and decrease the power consumption of the electric water heater 11 based on the system voltage at the power receiving point of the customer 6 thereby to keep the voltage at the receiving point constant, and the electric water heater 11 is generally provided in the customer 6, so the voltage at the receiving point can be maintained at the reference voltage at a low cost.

The invention claimed is:

1. A power system stabilization system for stabilizing a small-scale electric power system to which electrical power generated by a rotating power generator is supplied, said power system system comprising:
   an electric water heater that receives electrical power from the electric power system and heats water;
   a system frequency measuring device that measures system frequency of the electrical power supplied to the electric power system; and
   a hot water controller that increases power consumption of said electric water heater when the system frequency exceeds a reference frequency, and decreases the power consumption of said electric water heater when the system frequency is less than the reference frequency, wherein said hot water controller
      has a dead zone that is preset and is bounded by a dead zone upper limit and a dead zone lower limit,
      increases power consumption by an amount proportional to deviation of the system frequency from the dead zone upper limit when the system frequency exceeds the dead zone upper limit,
      decreases the power consumption by an amount proportional to deviation of the system frequency from the dead zone lower limit when the system frequency is less than the dead zone lower limit,
      has an up side control delay time or a down side control delay time that is preset to delay when the power consumption of said electric water heater begins to be increased or decreased from when the system frequency has deviated from the dead zone,
      increases the power consumption of said electric water heater when the system frequency has continuously exceeded the dead zone upper limit for the up side control delay time, beginning from when the system frequency exceeds the dead zone upper limit,
      decreases the power consumption of said electric water heater when the system frequency has been continuously less than the dead zone lower limit for the down side control delay time, beginning from when the system frequency becomes less than the dead zone lower limit,
      has a hot water storage rate upper limit and a hot water storage rate lower limit for hot water storage rate of said electric water heater, the hot water storage rate upper limit and the hot water storage rate lower limit being set beforehand,
      moves the dead zone toward a higher frequency, extends the up side control delay time, and shortens the down side control delay time when the hot water storage rate exceeds the hot water storage rate upper limit, and
      moves the dead zone toward a lower frequency, shortens the up side control delay time, and extends the down side control delay time when the hot water storage rate is less than the hot water storage rate lower limit.

2. The power system stabilization system as set forth in claim 1, wherein the rotating power generator raises the system frequency when the electrical power supplied to the electric power system is predicted to become excessive, and lowers the system frequency when the electrical power supplied to the electric power system is predicted to become insufficient.

3. A power system stabilization system for stabilizing a small-scale electric power system to which electrical power generated by a rotating power generator is supplied, said power system stabilization system comprising:
   an electric water heater that receives electrical power from the electric power system and heats water;
   a system frequency measuring device that measures system frequency of the electrical power system:
   a hot water controller that increases power consumption of said electric water heater when the system frequency exceeds a reference frequency, and decreases the power consumption of said electric water heater when the system frequency is less than the reference frequency: and
   a control center that calculates electricity price of the electrical power generated by the electric power system and sends the electricity price to said hot water controller, wherein said hot water controller
      has a dead zone that is preset and is bounded by a dead zone upper limit and a dead zone lower limit,
      increases power consumption by an amount proportional to deviation of the system frequency from the dead zone upper limit when the system frequency exceeds the dead zone upper limit,
      decreases the power consumption by an amount proportional to deviation of the system frequency from the dead zone lower limit when the system frequency is less than the dead zone lower limit,
      has an up side control delay time or a down side control delay time that is preset to delay when the power consumption of said electric water heater begins to be increased or decreased from when the system frequency has deviated from the dead zone
      increases the power consumption of said electric water heater when the system frequency has continuously exceeded the dead zone upper limit for the up side control delay time, beginning from when the system frequency exceeds the dead zone upper limit,
      decreases the power consumption of said electric water heater when the system frequency has been continuously less than the dead zone lower limit for the down side control delay time, beginning from when the system frequency becomes less than the dead zone lower limit,
      has an electricity price upper limit and an electricity price lower limit for the electricity price the electricity price upper limit and the electricity price lower limit being set beforehand,
      moves the dead zone toward a higher frequency, extends the up side control delay time, and shortens the down side control delay time when the electricity price exceeds the electricity price upper, and
      moves the dead zone toward a lower frequency, shortens the up side control delay time, and extends the down side control delay time when the electricity price is less than the electricity price lower limit.

4. The power system stabilization system as set forth in claim 3, wherein said control center lowers the electricity price when the electrical power supplied to the electric power system is predicted to become excessive, and raises the electricity price when the electrical power supplied to the electric power system is predicted to become insufficient.

* * * * *